(12) United States Patent
Miyaji et al.

(10) Patent No.: US 7,450,365 B2
(45) Date of Patent: *Nov. 11, 2008

(54) ELECTROSTATIC CHUCK

(75) Inventors: Jun Miyaji, Fukuoka (JP); Osamu Okamoto, Fukuoka (JP); Tetsuo Kitabayashi, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/879,204

(22) Filed: Jul. 16, 2007

(65) Prior Publication Data
US 2007/0258187 A1    Nov. 8, 2007

Related U.S. Application Data

(63) Continuation of application No. 11/272,788, filed on Nov. 15, 2005, now Pat. No. 7,248,457.

(51) Int. Cl.
*H01T 23/00* (2006.01)
(52) U.S. Cl. .................. 361/234; 501/153; 501/127
(58) Field of Classification Search ................. 361/234; 501/134, 153
See application file for complete search history.

(56) References Cited

U.S. PATENT DOCUMENTS

2005/0207088 A1* 9/2005 Nishimoto et al. .......... 361/234

FOREIGN PATENT DOCUMENTS

| JP | 05-211228    | 8/1993  |
| JP | 06-097675    | 11/1994 |
| JP | 08-81258 A   | 3/1996  |
| JP | 10-279349    | 10/1998 |
| JP | 11-312729    | 11/1999 |
| JP | 3084869      | 7/2000  |
| JP | 2000-243820 A| 9/2000  |
| JP | 2004-018296  | 1/2004  |
| JP | 2005-033125 A| 2/2005  |

* cited by examiner

*Primary Examiner*—Stephen W Jackson
*Assistant Examiner*—Lucy Thomas
(74) *Attorney, Agent, or Firm*—Carrier, Blackman & Associates, P.C.; William D. Blackman; Joseph P. Carrier

(57) ABSTRACT

The object of the present invention is to provide an electrostatic chuck in which the surface can be kept smooth after being exposed to plasma, so as to protect a material to be clamped such as a silicon wafer from being contaminated with particles, and which is excellent in clamping and releasing a material to be clamped. According to the present invention, there is provided an electrostatic chuck comprising a dielectric material in which alumina is 99.4 wt % or more, titanium oxide is more than 0.2 wt % and equal to or less than 0.6 wt %, whose average particle diameter is 2 µm or less, and whose volume resistivity is $10^8$-$10^{11}$ Ωcm in room temperature, wherein the electrostatic chuck is used in a low temperature of 100° C or less.

6 Claims, 2 Drawing Sheets

ELECTROSTATIC CHUCK

CROSS-REFERENCE TO RELATED APPLICATION

The present application is a continuation of application U.S. Ser. No. 11/272,788, filed Nov. 15, 2005 (now U.S Pat. 7,248,457).

BACKGROUND OF THE INVENTION

1. Field of the Invention

The present invention relates to an electrostatic chuck for clamping and fixing a material to be clamped such as a semiconductor wafer or a glass substrate for an PPD with electrostatic force.

2. Description of the Prior Art

Conventionally, a ceramic dielectric material of an electrostatic chuck is provided for the purpose of controlling the electrical characteristics (See Document 1).

However, if the ceramic structure is exposed to a plasma atmospheres the structure is subject to corrosion, and the source roughness is deteriorated. Consequently, there are some cases where variations in the contact state between the surface of the electrostatic chuck and the wafer occur over time, or there are other cases where rams are disjoined from a sintered body and the disjoined g particles cause the wiring of an LSI circuit to be shorted.

In another conventional example, an alumina ceramic material having a particle diameter of 2 μM or less and a relative density of 99.9% in which the plasmna-resistance is improved is applied to an electrostatic chuck (See Document 2). However, in this example, even if the plasma-resistance is improved, there is no description of the electrical characteristics, and it is impossible to perform fundamental functions of a Johnsen-Rahbeck electrostatic chuck which enables great clamping force.

Also, an alumina ceramic which contains titanium oxide of 0.1-1 wt % and has volume resistivity of $10^0$-$10^4$ Ωcm has been proposed (See Document 3). However, in this case, it is impossible to obtain electrical characteristics for performing functions of an electrostatic chuck.

Also, an electrostatic chuck in which the volume resistivity is reduced by adding titanium oxide of 0.5-2 wt % to an alumina ceramic has been proposed (See Document 4). This document has disclosed that the resistivity is not reduced in a case of less than 0.5 wt %, and too much current flows in a case of 2.0 wt % or more. It has also disclosed that titanimn oxide is precipitated in the gain boundary of alumina, ceramics. Although an additive of at least 0.5 wt % is required to reduce the volume resistivity, such an amount of the additive is too much for an electrostatic chuck which requires a strict limitation in contamination with respect to a material to be clamped.

Also, there has been proposed an electrostatic chuck in which alumina of 99% or more is contained, the average particle diameter is 1-3 μm, and the volume resistivity is $10^8$-$10^{11}$ Ωm in a temperature of 300-500° C. (See Document 5). However, there is no description of properties of an dielectric material required for an electrostatic chuck which is used in another temperature range, for example, a relatively low temperature such as 100° C. or less.

Document 1: Japanese Patent No. 3084869
Document 2: Japanese Patent Application Publication No. 10-279349
Document 3: Japanese Patent Application Publication No. 2004-18296
Document 4: Japanese Pre-grant Publication No. 6-97675
Document 5: Japanese Patent Application Publication No. 11-312729

The object of the present invention is to provide an electrostatic chuck in which the surface can be kept smooth after being exposed to plasma, so as to protect a material to be clamped such as a silicon wafer from a being contaminated with particles, and which is excellent in clamping and releasing a material to be clamped.

SUMMARY OF THE INVENTION

In order to achieve the above-mentioned object, according to the present invention, there is provided an electrostatic chuck including a dielectric material in which alumina is 99.4 wt % or more, titanium oxide is more than 0.2 wt % and equal to or less than 0.6 wt %, whose average particle diameter is 2 μm or less, and whose volume resistivity is $10^8$-$10^{11}$ Ωcm in a room temperature, wherein the electrostatic chuck is used il a low temperature of 100° C. or less. With this, it is possible to improve the plasma resistance of the electrostatic chuck dielectric material and achieve fundamental functions of the electrostatic chuck at the same time.

The reason why the volume resistivity needs to be $10^8$-$10^{11}$ Ωcm is for using Johnsen-Rahbeck effects as clamping force of the electrostatic chuck It is possible to generate very great clamping force by using Johnsen-Rabbeck effects. Consequently, it is possible to reduce the contact area with h a al to be clamped so as to be 1-10% with respect to the area of the clamping surface by providing protrusions on the surface of the electrostatic chuck.

Further, by adjusting the height of the protrusions provided on the surface to be 5-15 μm, it is possible to exert clamping force even in non-contact portions. As a result of this, the area of the protrusions can be 0.001% or more and less than 0.5% with respect to the area of the clamping surface. As for the temperature of the material to be clamped, beat transfer is performed via the contact portions. Consequently, even if the structure of the protrusions is subject to corrosion caused by the plasma, such effect can be reduced as the contact area of the protrusions decreases. Therefore, it is possible to achieve an electrostatic chuck in which little variations occur over time by improving the plasma-resistance and reducing the contact area with the material to be clamped.

In order to improve the response properties of the clamping force, it is necessary to decrease the value of the following equation:

$$ts = 1.731 \times 10^{-11} \times \rho(\epsilon r + d/h) \quad \text{(sec.)}$$

where ts is time (sec.) required for decreasing the clamping force to be 2% with respect to the initial clamping force of 100%, ρ is volume resistivity of the dielectric layer (ΩM), εr is the relative dielectric constant of the dielectric layer, d is the thickness of the dielectric layer (m), and h is the height of the protrusions (m). When the value of this equation is 0.001-0.6 and the height of the protrusions is 5-15 μm, the area of the protrusions can be 0.001-0.5% with respect to the clamping surface. At the same time, it is possible to achieve an electrostatic chuck having good response of clamping force with respect to applying or removing voltage.

The above-mentioned equation is obtained by making an analytical calculation based on the equivalent circuit shown in FIG. 1 and deriving Equations 14. In these equations, $q_1$ is the charge density, S is the electrode area, C is the capacitance, G is the conductance, V is the applied voltage, i is time (variable), and T is time for applying voltage.

Equation 1

$$f = \frac{q_1^2}{2\delta_0} \quad \left(q_1 = \frac{Q_1}{S}\right) \quad (1)$$

$$0 \le t \le T$$

$$q_1(t) = q_r(t) + q_j(t)$$

$$q_r = C_1 \frac{C_2}{C_1 + C_2} V \cdot \exp\left(-\frac{G_2}{C_1 + C_2} t\right) \quad (2)$$

$$q_j = C_1 \frac{G_2}{G_1 + G_2} V \cdot \left\{1 - \exp\left(-\frac{G_2}{C_1 + C_2} t\right)\right\} \quad (3)$$

$$t > T \quad (4)$$

$$q_1(t) = q_r(t) + q_j(t) - \{q_r(t - T) + q_j(t - T)\}$$

Equation 2

$$\tau = \frac{2(C_1 + C_2)}{G_2}$$

Equation 3

$$C_1 = \varepsilon_0 \frac{S}{d}$$

$$C_2 = \varepsilon_0 \varepsilon_r \frac{S}{h}$$

$$G_2 = \frac{1}{R_2} = \frac{S}{\rho d}$$

Equation 4

$$t > T$$

$$q_1 = C_1 \frac{C_1}{C_1 + C_2} V \cdot \exp\left(-\frac{G_2}{C_1 + C_2} (t - T)\right)$$

According to another aspect of the present invention, there is provided an electrostatic chuck including a dielectric material in which alumina is 99.4 wt % or more, titanium oxide is more than 0.2 wt % and equal to or less than 0.6 wt %, whose average particle diameter is 2 ;im or less, whose bulk density is 3.97 g/cm$^3$ or more, and whose volume resistivity is $10^8$-$10^{11}$ Ωcm in room temperature, wherein the electrostatic chuck is used in a low temperature of 100° C. or less. With this, the porosity of the structure of the electrostatic chuck is small, and improvement of the plasma resistance and fundamental functions of the electrostatic chuck can be achieved at the same time.

In the above-mentioned electrostatic chuck, the dielectric material having a smooth surface includes a plurality of protrusions on which a material is to be clamped is mounted, in which the ratio between the total area of the top surfaces of the protrusions and the area of the surface of the dielectric material is equal to or more than 0.001% and less than 0.5%, and the height of the protrusions is 5-15 μm. With this, it is possible to minimize the effect of variation in the clamping state caused by damage of the surface of the contact area with the material to be clumped due to corrosion by plasma However, if the ratio of the contact area is less than 0.001%, the size of each protrusion will be too small and the processing will be difficult. If the ratio of the contact area exceeds 1%, it becomes impossible to disregard the effect of plasma corrosion to the surface of the protrusions in contact with the material to be clamped.

DETAILED DESCRIPTION OF PREFERRED EMBODIMENTS

Figure 1:
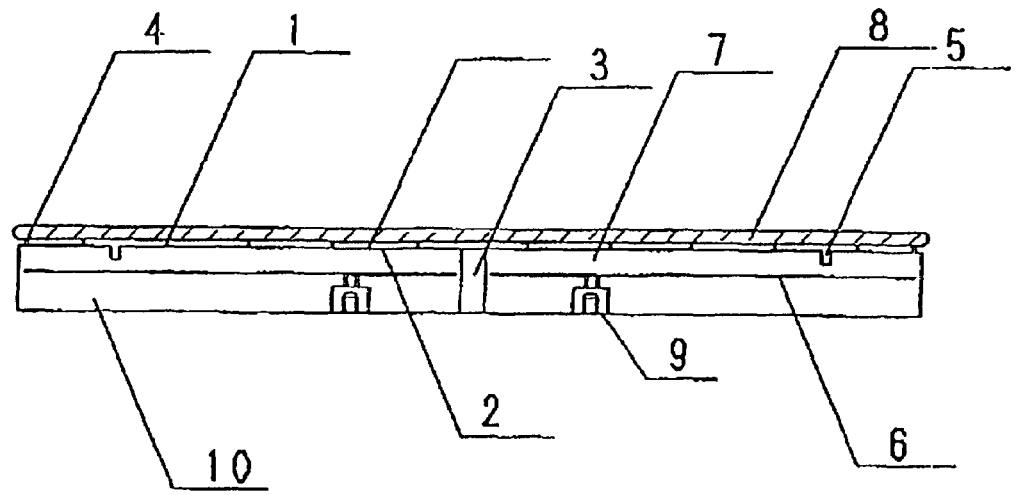
FIG. 1 shows an electrostatic chuck according to the present invention.
Figure 2:
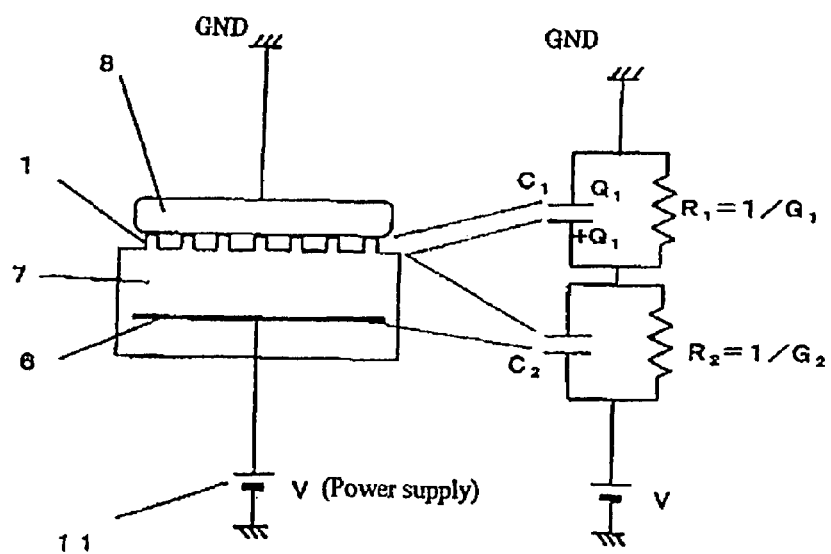
FIG. 2 shows an equivalent circuit of the electrostatic chuck according to the present invention.
Figure 3:
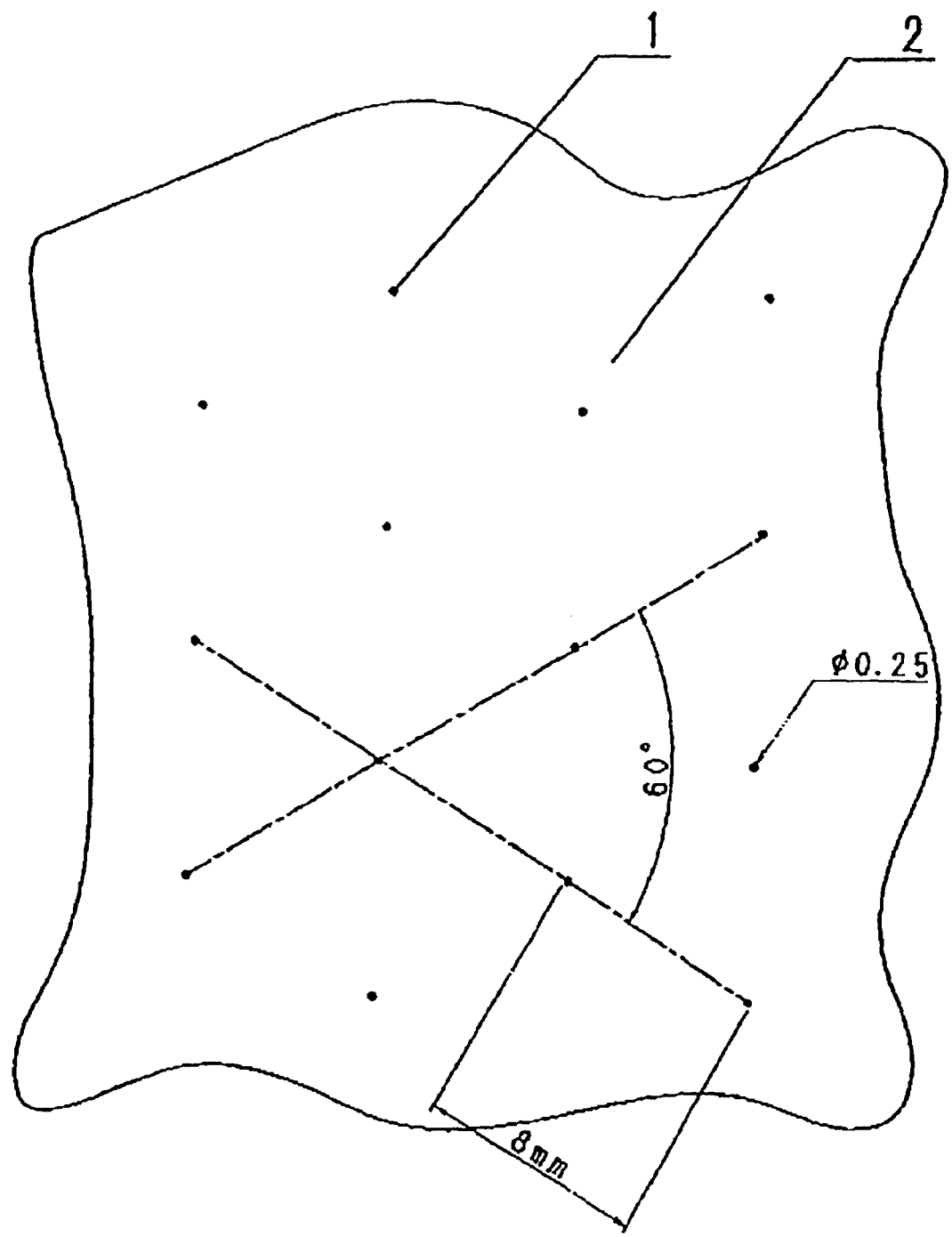
FIG. 3 is an enlarged view of the surface pattern of the electrostatic chuck according to the present invention.

Alumina, titanium oxide, and transition metal oxide as ingredients were granulated at a mixing ratio shown in Table 1. The average particle diameter of the alumina was 0.1 μm, and the purity of the alumina was 99.99% or more. The purity of the titanium oxide was 98% or more.

Slurry Preparation, Granulation, and Raw Processing

The above ingredients were mixed at the mixing ratio shown in Table 1, and crushed. After an acrylic binder was added and adjusted, granulation by spraydrying was performed to prepare granulated powder. After the granulated powder was filled in a rubber mold, CIP (pressure: 1 ton/cm$^2$) was performed, and an ingot was formed. The ingot was processed to have a predetermined shape, and a raw formed body was obtained Ion-exchange water or the like was used for mixing, so that contaminants could be prevented from entering as much as possible.

Firing

The above raw formed body was fired in an atmosphere of nitrogen and hydrogen gas. The firing temperature was 1150-1350° C., and the firing time was 1-8 hours. That is, conditions for achieving the highest bulk density were selected. In this instance, humidifying gas was used so as to degree. By performing reduction firing, it is possible to achieve non-stoichiometric composition of titanium oxide and adjustment of the volume resistivity.

HIP Processing

Further, HIP processing was performed. The conditions for HIP were Ar gas of 1500 atm. and a temperature identical to the firing temperature or less than the firing temperature by 30° C.

Measurements of Properties

After the HIP processing, measurements of the bulk density, the average particle diameter by observing of the structure of the fired body with an SEM, the volume resistivity, the friction force in vacuum, and the remaining time were performed. For the measurements of the friction force and the remaining time, the thickness of the ceramic dielectric layer was 1 mm. Voltage of 200 V was applied as clamping voltage. For the measurement of the remaining time, the power supply was turned off after voltage was applied for 1 minute, and the damping of the remaining friction force was measured. The material to be clamped was a mirror surface of a silicon wafer. The remaining time was a period of time from turning the power supply off to damping the friction force to 2%.

Also, plasma irradiation was actually performed, and variation in the surface routes (centerline average roughness Ra) of the ceramics was measured. The roughness Ra was 0.05 μm or less in the initial state. Plasma was discharged for 5 hours at 1000 W in a reactive ion etching apparatus with $CF_4+O_2$ as etching gas.

Further, in order to evaluate actual clamping force of the electrostatic chuck pressure of He gas was applied between some of the samples and the material to be clamped so as to measure the pressure where the material to be clamped is released (POPOFF clamping force). The clamping voltage was 1000 V.

Comparative Products

Examples of alumina ceramics according to the convention method were eared for comparison The composition of comparative product 1 was alumina of 98 wt % having an average particle diameter of 5 μm and titanium oxide of 2 wt %. The composition of comparative product 2 was alumina of 99 wt % and titanium oxide of 1 wt %, and the firing temperature was 1580° C. The surface roughness of comparative product 1 was Ra 0.23 μm in the initial state. The surface roughness of comparative product 2 was Ra 0.2 μm in the initial state. No HIP processing was performed to comparative products 1 and 2.

The results of the above-mentioned tests are shown in Tables 1 and 2. It turned out that a structure having an average particle diameter of 2 μm or less and volume resistivity enough to function as an electrostatic chuck can be obtained in an addition amount of titanium oxide which is more than 0.2 wt % and equal to and less than 0.6 wt % by controlling the firing temperature. Specifically, the same effect can be obtained in an extremely small addition amount compared to the amount of a conventional case where the particle diameter is 50 μm or more. It is assumed that the reason is because titanium oxide is easily dissolved into alumina when the particle diameter is reduced. It is also assumed that chemical contamination to a silicon wafer or the like can be controlled significantly compared to the conventional art because the addition amount of titanium oxide can be reduced by reducing the particle diameter of the sintered body.

As a result of the electrical properties evaluation, it turned out that the volume resistivity can be controlled in the wide range of $10^8$-$10^{16}$ Ωcm depending on the addition amount of titanium oxide alone or titanium oxide and transition metal oxide.

Regarding the electrical properties required for a dielectric material for an electrostatic chuck, it is preferable that the volume resistivity is $10^8$-$10^{11}$ Ωcm in a temperature where the electrostatic chuck is used. If it is less than $10^8$ Ωcm which is the minimum, too much current flows into a wafer and the device might be damaged. If it is more than $10^{11}$ Ωcm which is the maximum, the response of wafer clamping and release to the applied voltage is deteriorated.

In processes such as an etching process of 100° C. or less, for example, the minimum value is preferably around $10^9$-$10^{11}$ Ωcm.

Also, if titanium oxide is more than 0.6 wt %, the volume resistivity becomes less than $10^8$ Ωcm too much current flows into a wafer and the device might be damaged. If titanium oxide is 0.2 wt % or less, the effect of reducing the volume resistivity by adding titanium oxide might be reduced.

The plasma resistance was evaluated based on variation in the surface roughness because any material is etched if ion energy in plasma is excessive.

As for the ceramic dielectric material according to the present invention, variation in the surface roughness was significantly small compared to a conventional one. It is assumed that this is because the size of particles is small. As shown in Table 2, after the material has undergone hot isostatic pressing (HIP) processing, and after the chuck is exposed to plasma discharge for five hours at 1000 W with $CF_4+O_2$ as etching gas, a difference between surface roughness Ra before the plasma irradiation and after the plasma irradiation is much less than 0.33, which is the difference in surface roughness for the comparative product 1. For example Nos. 2, 4, 6, 8 the difference is 0.03, and for example Nos. 10, 12, 14 the difference is 0.04.

An electrostatic chuck comprising a dielectric material having a smooth surface was produced, in which a plurality of protrusions on which a material to be clamped is mounted were formed and the volume resistivity was $10^{9.3}$ Ωcm, and in which the ratio between the total area of the top surfaces of the protrusions and the area of the surface of the dielectric material was 0.089%. In this instance, the protrusions having a diameter of Φ 0.25 were formed in each vertex of equilateral triangles having a side of 8 mm which were adjacent to each other. The height of the protrusions was 10 μm.

TABLE 1

| No. | Alumina | Titanium oxide | Firing temperature ° C. | Bulk density of fired body g/cm³ |
|---|---|---|---|---|
| 1 | 100 wt % | 0 wt % | 1240 | 3.79 |
| 2 | 100 wt % | 0 wt % | 1270 | 3.88 |
| 3 | 99.9 wt % | 0.1 wt % | 1300 | 3.78 |
| 4 | 99.9 wt % | 0.1 wt % | 1240 | 3.89 |
| 5 | 99.8 wt % | 0.2 wt % | 1210 | 3.74 |
| 6 | 99.8 wt % | 0.2 wt % | 1240 | 3.89 |
| 7 | 99.7 wt % | 0.3 wt % | 1180 | 3.23 |
| 8 | 99.7 wt % | 0.3 wt % | 1210 | 3.91 |
| 9 | 99.6 wt % | 0.4 wt % | 1180 | 3.60 |
| 10 | 99.6 wt % | 0.4 wt % | 1210 | 3.92 |
| 11 | 99.5 wt % | 0.5 wt % | 1150 | 3.60 |
| 12 | 99.5 wt % | 0.5 wt % | 1180 | 3.92 |
| 13 | 99.4 wt % | 0.6 wt % | 1150 | 3.92 |
| 14 | 99.4 wt % | 0.6 wt % | 1180 | 3.92 |
| Comparative product 1 | 98 wt % | 2 wt % | 1580 | 3.75 |
| Comparative product 2 | 99 wt % | 1 wt % | 1580 | 3.7 |

TABLE 2

| No. | Bulk density after HIP g/cm³ | Average particle diameter of fired body μm | Volume resistivity after HIP Ωcm | Friction force at voltage of 200 V gf/cm³ | Remaining time Min. | Surface roughness before plasma processing μm | Surface roughness after plasma processing μm |
|---|---|---|---|---|---|---|---|
| 2 | 3.98 | 0.9 | >$10^{15}$ | >400 | >300 | 0.03 | 0.06 |
| 4 | 3.98 | 1.1 | $10^{15}$ | >400 | >300 | 0.03 | 0.06 |
| 6 | 3.98 | 1.3 | $10^{12.7}$ | >400 | 120 | 0.03 | 0.06 |
| 8 | 3.98 | 1.4 | $10^{10}$ | >400 | 8 | 0.03 | 0.06 |
| 10 | 3.98 | 1.5 | $10^{9.3}$ | >400 | 4 | 0.03 | 0.07 |
| 12 | 3.98 | 1.5 | $10^{8.5}$ | >400 | 1 | 0.03 | 0.07 |
| 14 | 3.97 | 1.7 | $10^{8.3}$ | >400 | 1 | 0.03 | 0.07 |
| Comparative product 1 | — | 80 | $10^{10.3}$ | >400 | 15 | 0.23 | 0.56 |
| Comparative product 2 | — | 70 | $10^{11}$ | >400 | 30 | 0.2 | 0.6 |

According to this electrostatic chuck, it was possible to extremely reduce the temperature variation which occurs over time at the time of processing a silicon wafer as a material to be clamped due to both of small variation of the surface roughness after the plasma irradiation and the very small contact area with the material to be clamped.

The POPOFF clamping force was 100 torr or more with respect to all samples. Specifically, it was shown that sufficiently force for clamping a silicon wafer or the like was obtained As is explained in the above, according to the present invention, it is possible to produce an electrostatic chuck in which the surface can be kept smooth after being exposed to plasma, so as to protect a material to be clamped such as a silicon wafer from being contaminated with particles, and which is excellent in clamping and releasing a material to be clamped

What is claimed is:

1. An electrostatic chuck comprising a dielectric material in which alumina is 99.4 wt % or more, titanium oxide is more than 0.2 wt % and equal to or less than 0.6 wt %, whose volume resistivity is $10^8$-$10^{11}$ $\Omega$cm in room temperature, wherein the electrostatic chuck undergoes hot isostatic pressing, and after the chuck is exposed to plasma discharge for five hours at 1000 W with $CF_4+O_2$ as etching gas, a difference between surface roughness Ra before the plasma irradiation and after the plasma irradiation is less than 0.33.

2. An electrostatic chuck comprising a dielectric material in which alumna is 99.4 wt% or more, titanium oxide is more than 0.2 wt% and equal to or less than 0.6 wt% whose bulk density is 3.97 g/cm$^3$ or more, and whose volume resistivity is $10^8$-$10^{11}$$\Omega$cm in room temperature, wherein the electrostatic chuck is undergoes hot isostatic pressing, and after the chuck is exposed to plasma discharge for five hours at 1000 W with $CF_4+O_2$ as etching gas, a difference between surface roughness Ra before the plasma irradiation and after the plasma irradiation is less than 0.33.

3. The electrostatic chuck according to claim 1 wherein the dielectric material having a smooth surface comprises a plurality of protrusions on which a material to be clamped is mounted, in which the ratio between the total area of the top surfaces of the protrusions and the area of the surface of the dielectric material is equal to or more than 0.001 % and less than 0.5%, and the height of the protrusions is 5-15 μm.

4. The electrostatic chuck according to claim 1 wherein the dielectric material having a smooth surface comprises a plurality of protrusions on which a material to be clamped is mounted, in which the ratio between the total area of the top surfaces of the protrusions and the area of the surface of the dielectric material is equal to or more than 0.001 % and less than 0.5%, and the height of the protrusions is 5-15 μm.

5. The electrostatic chuck according to claim 1 wherein the difference between surface roughness Ra before the plasma irradiation and after the plasma irradiation is less than 0.05.

6. The electrostatic chuck according to claim 2 wherein the difference between surface roughness Ra before the plasma irradiation and after the plasma irradiation is less than 0.05.

* * * * *

UNITED STATES PATENT AND TRADEMARK OFFICE
CERTIFICATE OF CORRECTION

PATENT NO. : 7,450,365 B2
APPLICATION NO. : 11/879204
DATED : November 11, 2008
INVENTOR(S) : Miyaji et al.

It is certified that error appears in the above-identified patent and that said Letters Patent is hereby corrected as shown below:

Column 1:
Line 15, change "substrate for an PPD" to --substrate for an FPD--.
Line 22, change "atmospheres the" to --atmosphere, the--.
Line 26, change "rams are disjoined" to --grains are disjoined--.
Line 27, change "disjoined g particles" to --disjoined grain particles--.
Line 30, change "2 $\mu$M or less" to --2 $\mu$m or less--.
Line 31, change "plasmna-resistance" to --plasma resistance--.
Line 48, change "disclosed that titanimn" to --disclosed that titanium--.
Line 49, change "the gain boundary" to --the grain boundary--.
Line 58, change "$10^8$-$10^{11}$ $\Omega$m" to --$10^8$-$10^{11}$ $\Omega$cm--.
Line 59, change "properties of an dielec-" to --properties of a dielec- --.

Column 2:
Line 7, change "clamped such as a silicon wafer from a being" to --clamped, such as a silicon wafer, from being--.
Line 19, change "chuck is used il" to --chuck is used in--.
Line 27, change "using Johnsen-Rabbeck effects." to --using Johnsen-Rahbeck effects.--.
Line 28, change "area with h a al" to --area with a material--.
Line 38, change "beat transfer is" to --heat transfer is--.
Line 44, change "plasma-resistance" to --plasma resistance--.
Line 49, in the equation change "$\rho(\epsilon r + d/h)$" to --$\rho(\varepsilon r + d/h)$--.
Line 53, change "layer ($\Omega$M), $\epsilon$r" to --layer ($\Omega$m), $\varepsilon$r--.
Line 64, change "deriving Equations 14." to --deriving Equations 1-4.--.
Line 66, change "i is time" to --t is time--.

Column 3:
Line 4, change "$2\delta_0$" to --$2\varepsilon_0$--; delete "(1)" from the far right end of the line.
Line 8, change "$q_1(t) = q_r(t) + q_j(t)$" to --$q_1(t) = q_C(t) + q_j(t)$     (1)--.
Line 11, change "$q_r$" to --$q_C$--.
Line 15, at the end of the line that says "$t > T$", delete "(4)".
Line 16, change "$q_r$" to --$q_C$-- (both occurrences); at the far right end of the line, insert --(4)--.
Line 39, change "diameter is 2 ;im" to --diameter is 2 $\mu$m--.
Line 56, after "corrosion by plasma" insert a period.

UNITED STATES PATENT AND TRADEMARK OFFICE
CERTIFICATE OF CORRECTION

PATENT NO. : 7,450,365 B2
APPLICATION NO. : 11/879204
DATED : November 11, 2008
INVENTOR(S) : Miyaji et al.

It is certified that error appears in the above-identified patent and that said Letters Patent is hereby corrected as shown below:

Column 4:
 Line 18, change "spraydrying" to --spray-drying--.
 Line 23, change "obtained Ion-exchange" to --obtained. Ion-exchange--.
 Line 31, change "so as to degree." to --so as to degrease.--.
 Line 57, change "surface routes" to --surface roughness--.
 Line 58, change "The roughness Ra" to --The surface roughness Ra--.
 Line 63, change "chuck pressure" to --chuck, pressure--.

Column 5:
 Line 2, change "according to the convention" to --according to the conventional--.
 Line 3, change "were eared for comparison" to --were prepared for comparison.--.

Column 6:
 Line 19, change "Ωcm too much" to --Ωcm, too much--.
 Line 31, change "hot isos-" to --hot iso- --.
 Line 32, change "tatic pressing" to --static pressing--.

Column 7:
 Line 9, change "ciently force" to --ciently useful force--.
 Line 14, change "clamped such as" to --clamped, such as--.
 Line 15, change "wafer from being" to --wafer, from being--.
 Line 30, change "in which alumna is" to --in which alumina is--.

Column 8:
 Line 4, change "chuck is undergoes" to --chuck undergoes--.
 Line 16, change "according to claim 1" to --according to claim 2--.

Signed and Sealed this

Twenty-fourth Day of February, 2009

JOHN DOLL
*Acting Director of the United States Patent and Trademark Office*